US007892396B2

(12) United States Patent
Sheasley

(10) Patent No.: US 7,892,396 B2
(45) Date of Patent: *Feb. 22, 2011

(54) TOUGHENED ACTIVATABLE MATERIAL FOR SEALING, BAFFLING OR REINFORCING AND METHOD OF FORMING SAME

(75) Inventor: David Sheasley, Rochester, MI (US)

(73) Assignee: Zephyros, Inc., Romeo, MI (US)

( * ) Notice: Subject to any disclaimer, the term of this patent is extended or adjusted under 35 U.S.C. 154(b) by 692 days.

This patent is subject to a terminal disclaimer.

(21) Appl. No.: 11/757,499

(22) Filed: Jun. 4, 2007

(65) Prior Publication Data

US 2008/0029200 A1 Feb. 7, 2008

Related U.S. Application Data

(60) Provisional application No. 60/804,117, filed on Jun. 7, 2006, provisional application No. 60/828,704, filed on Oct. 9, 2006.

(51) Int. Cl.
| | |
|---|---|
| B29C 65/00 | (2006.01) |
| B32B 37/00 | (2006.01) |
| C04B 37/00 | (2006.01) |
| C09J 163/00 | (2006.01) |
| C08F 283/00 | (2006.01) |
| C08G 59/14 | (2006.01) |
| C08L 63/00 | (2006.01) |

(52) U.S. Cl. .................. 156/330; 156/293; 156/325; 525/524

(58) Field of Classification Search ............ 156/293, 156/325, 330; 525/524
See application file for complete search history.

(56) References Cited

U.S. PATENT DOCUMENTS

| | | | |
|---|---|---|---|
| 3,944,631 A | 3/1976 | Yu et al. | |
| 3,984,497 A | 10/1976 | Owens et al. | |
| 3,985,703 A | 10/1976 | Ferry et al. | |
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,275,853 A | 1/1994 | Silvis et al. | |
| 5,358,397 A | 10/1994 | Ligon et al. | |

(Continued)

FOREIGN PATENT DOCUMENTS

EP    0253405 A    1/1988

(Continued)

OTHER PUBLICATIONS

Co-Pending Application, U.S. Appl. No. 10/236,315, filed Sep. 6, 2002, existing as 6,786,533.

(Continued)

*Primary Examiner*—Philip C Tucker
*Assistant Examiner*—Michael N Orlando
(74) *Attorney, Agent, or Firm*—Dobrusin & Thennisch PC

(57) ABSTRACT

An activatable material and articles incorporating the same is disclosed. The activatable material includes at least three of epoxy resin; impact modifier; blowing agent; curing agent; and filler. The activatable material is preferably used for sealing, baffling, adhering or reinforcing an article of manufacture such as an automotive vehicle.

7 Claims, 3 Drawing Sheets

U.S. PATENT DOCUMENTS

| | | | |
|---|---|---|---|
| 5,464,924 | A | 11/1995 | Silvis et al. |
| 5,686,509 | A | 11/1997 | Nakayama et al. |
| 5,686,551 | A | 11/1997 | White et al. |
| 5,962,093 | A | 10/1999 | White et al. |
| 6,111,015 | A * | 8/2000 | Eldin et al. .................. 525/65 |
| 6,263,635 | B1 | 7/2001 | Czaplicki |
| 6,296,298 | B1 | 10/2001 | Barz |
| 6,311,452 | B1 | 11/2001 | Barz et al. |
| 6,358,584 | B1 | 3/2002 | Czaplicki |
| 6,419,305 | B1 | 7/2002 | Larsen |
| 6,467,834 | B1 | 10/2002 | Barz et al. |
| 6,474,723 | B2 | 11/2002 | Czaplicki et al. |
| 7,438,782 | B2 * | 10/2008 | Sheasley et al. ............. 156/293 |
| 2003/0199628 | A1 * | 10/2003 | Weese et al. ................ 524/504 |
| 2004/0101349 | A1 | 5/2004 | Weisser et al. |
| 2004/0204551 | A1 | 10/2004 | Czaplicki et al. |
| 2004/0221953 | A1 * | 11/2004 | Czaplicki et al. ............ 156/293 |
| 2006/0020076 | A1 | 1/2006 | Finerman |

FOREIGN PATENT DOCUMENTS

| | | |
|---|---|---|
| EP | 0327039 | 8/1989 |
| EP | 1359202 A | 11/2003 |
| EP | 1391250 A2 | 2/2004 |
| JP | 4059819 A | 2/1992 |
| JP | 9305103 A | 3/1993 |
| JP | 9249730 A | 9/1997 |
| JP | 10139981 A | 5/1998 |
| JP | 2001040070 A | 2/2001 |
| WO | 9618669 A | 6/1996 |
| WO | 9958591 A | 11/1999 |

OTHER PUBLICATIONS

Co-Pending Application, U.S. Appl. No. 10/098,952, filed Mar. 15, 2002, abandoned due to failure to respond to office action.

Co-Pending Application, U.S. Appl. No. 10/337,446, filed on Jan. 7, 2003, existing as 7,318,873.

Co-Pending Application, U.S. Appl. No. 09/939,152, filed Aug. 24, 2001, existing as 6,855,652.

Co-Pending Application, U.S. Appl. No. 09/459,756, filed Dec. 10, 1999, existing as 6,668,457.

Co-Pending Application, U.S. Appl. No. 60/409,625, filed Sep. 10, 2002, provisional application expired.

Co-Pending Application, U.S. Appl. No. 60/333,273, filed Nov. 14, 2001, provisional application expired.

Co-Pending Application, U.S. Appl. No. 60/317,201, filed Sep. 5, 2001, provisional application expired.

Co-Pending Application, U.S. Appl. No. 10/234,902, filed Sep. 4, 2002, existing as 6,887,914.

Co-Pending Application, U.S. Appl. No. 10/386,287, filed Mar. 11, 2003, existing as 6,846,559.

Co-Pending Application, U.S. Appl. No. 60/451,811, filed Mar. 4, 2003, provisional application expired.

Co-Pending Application, U.S. Appl. No. 10/342,025, filed Jan. 14, 2003, existing as 7,043,815.

International Search Report PCT/US2007/070404 dated Feb. 21, 2008.

European Office Action dated Sep. 14, 2010, Application No. 07 840 224:5.

European Office Action dated Sep. 22, 2010, Application No. 07 840 224:5.

International Preliminary Report on Patentability, PCT Application No. PCT/US2007/070404, dated Sep. 5, 2008.

* cited by examiner

US 7,892,396 B2

TOUGHENED ACTIVATABLE MATERIAL FOR SEALING, BAFFLING OR REINFORCING AND METHOD OF FORMING SAME

FIELD OF THE INVENTION

The present invention relates generally to an activatable material, a method of forming the activatable material and a method of using the activatable material for sealing, baffling, adhering or reinforcing of components of articles of manufacture such as automotive vehicles.

BACKGROUND OF THE INVENTION

For many years industry, and particularly the transportation industry has been concerned with sealing, baffling, acoustic attenuation, adhesion and reinforcement of articles of manufacture such as automotive vehicles. In turn, industry has developed a wide variety of materials for providing such sealing, baffling, adhesion and reinforcement. The present invention, therefore, seeks to provide an improved material for sealing, baffling, adhesion or reinforcement, a method of forming the improved material and a method for use of the improved material for reinforcing, sealing, adhering or baffling.

DETAILED DESCRIPTION

Figure 1:
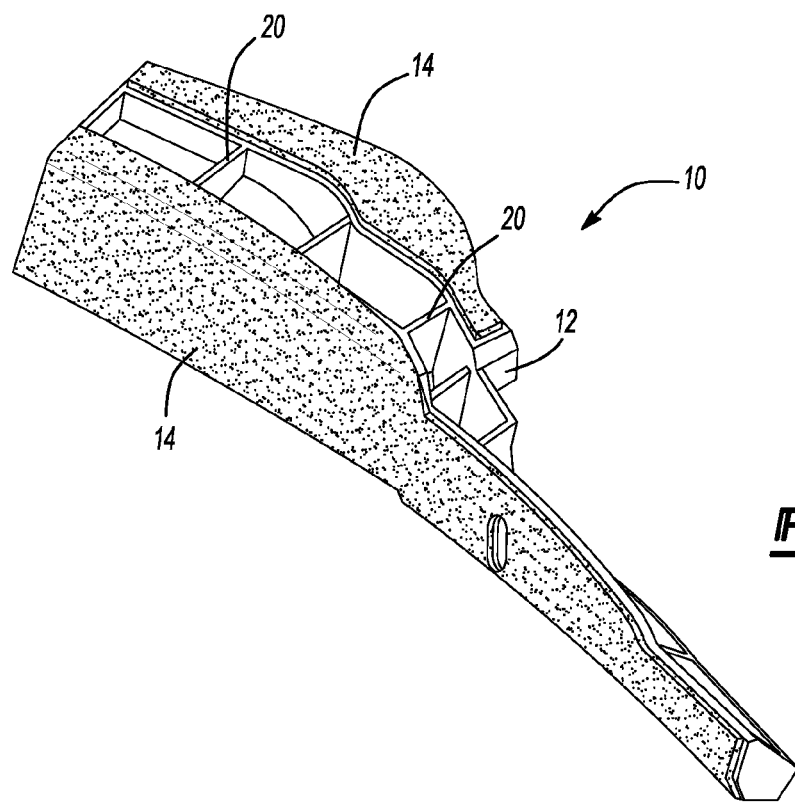
FIG. 1 is a perspective view of a reinforcement member formed in accordance with an aspect of the present invention.

The present invention is predicated upon provision of an improved activatable material, and articles incorporating the same. The activatable material preferably assists in providing structural reinforcement, adhesion, sealing, baffling, acoustical damping properties or a combination thereof within a cavity of, or upon a surface of a structure, or to one or more structural members (e.g., a body panel or structural member) of an article of manufacture (e.g., an automotive vehicle). As used herein, the phrase activatable material includes any material that may be activated to melt, flow, cure (e.g., thermoset), expand, foam or a combination thereof by an ambient condition or another condition. For example, the material may expand, foam, flow, melt, cure, a combination thereof or the like upon exposure to a condition such a heat, pressure, chemical exposure, combinations thereof or the like.

The activatable material typically includes a polymeric admixture, an impact modifier and one or a combination of a blowing agent, a curing agent and a filler. The activatable material preferably includes at least three of the following:

(a) about 2 to about 80 percent by weight epoxy resin;
(b) about 2 to about 70 percent by weight polymer or oligomer (e.g., epoxy)/elastomer adduct;
(c) one or more additional polymers, which typically include a one or more ethylene polymers or copolymers;
(d) about 2 to about 70 percent by weight impact modifier;
(e) up to about 5 parts by weight of a blowing agent;
(f) up to about 7 parts by weight of a curing agent; and
(g) a filler.

The concentration may be higher or lower depending upon the intended application of the activatable material. In a preferred aspect of the invention, the impact modifier includes one or more core/shell polymers.

The activatable material of the present invention may be applied to various articles of manufacture for adding structural integrity to portions or members of articles or for sealing the articles. Examples of such articles of manufacture include, without limitation, household or industrial appliances, furniture, storage containers, buildings, structures or the like. In preferred embodiments, the activatable material is applied to portions of an automotive vehicle such as body or frame members (e.g., a vehicle frame rail) of the automotive vehicle. One method of the present invention contemplates applying the activatable material to a surface of one of the above structures in an unexpanded or partially expanded state and activating the material for expanding (e.g., foaming) it to a volume greater than its volume in the unexpanded state (e.g., at least 5% greater, at least 50% greater, at least 200% greater, at least 1000% greater, at least 2000% greater, at least 5000% greater or higher). It is also typically preferred at least for reinforcement application that the volumetric expansion such that the expanded volume is less than 800%, more typically less than 500%, even more typically less than 400% and possibly less than 300% relative to the original unexpanded volume. It is also contemplated that the volume of the material may be less after activation due to curing (e.g., cross-linking) for foamed or unfoamed versions of the activatable material.

Percentages herein refer to weight percent, unless otherwise indicated.

Epoxy Resin

Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes up to about 80% or more of an epoxy resin. More preferably, the expandable material includes between about 2% and 70% by weight epoxy resin, more preferably between about 4% and 30% by weight epoxy resin and even more preferably between about 7% and 18% by weight epoxy resin. Of course, amounts of epoxy resin may be greater or lower depending upon the intended application of the activatable material. As an example, it is contemplated that weight percentages may be lower or higher when other ingredients such as the adduct, filler, alternative polymers, combinations thereof or the like are used in greater or lesser weight percentages.

The epoxy may be aliphatic, cycloaliphatic, aromatic or the like. The epoxy may be supplied as a solid (e.g., as pellets, chunks, pieces or the like) or a liquid (e.g., an epoxy resin). As used herein, unless otherwise stated, a resin is a solid resin if it is solid at a temperature of 23° C. and is a liquid resin if it a liquid at 23° C. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the activatable material to increase the adhesion, flow properties or both of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well. Examples of suitable epoxy resins are sold under the tradename DER® (e.g., DER 331, DER 661, DER 662), commercially available from the Dow Chemical Company, Midland, Mich.

Adduct

While it is contemplated that various polymer/elastomer adducts may be employed according to the present invention, one preferred adduct is an epoxy/elastomer adduct. In a highly preferred embodiment, an elastomer-containing adduct is employed in the activatable material of the present invention in a relatively high concentration. The epoxy/elastomer hybrid or adduct may be included in an amount of up to about 80% by weight of the adhesive material. More preferably, the elastomer-containing adduct is approximately at least 5%, more typically at least 7% and even more typically at least 10% by weight of the activatable material can be up to 60% or more, but more preferably is about 10% to 30% by weight of the activatable material. Of course, the elastomer-containing adduct may be a combination of two or more particular adducts and the adducts may be solid adducts or liquid adducts at a temperature of 23° C. or may also be combinations thereof. In one preferred embodiment, the adduct is composed of substantially entirely (i.e., at least 70%, 80%, 90% or more) of one or more adducts that are solid at a temperature of 23° C.

The adduct itself generally includes about 1:5 to 5:1 parts of epoxy or other polymer to elastomer, and more preferably about 1:3 to 3:1 parts or epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound may be suitable for the adduct a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. An example of a preferred epoxy/elastomer adducts is sold under the tradename HYPOX RK 8-4 commercially available from CVC Chemical. Examples of additional or alternative epoxy/elastomer or other adducts suitable for use in the present invention are disclosed in U.S. Patent Publication 2004/0204551, which is incorporated herein by reference for all purposes.

The elastomer-containing adduct, when added to the activatable material, preferably is added to modify structural properties of the activatable material such as strength, toughness, stiffness, flexural modulus, or the like. Additionally, the elastomer-containing adduct may be selected to render the activatable material more compatible with coatings such as water-borne paint or primer system or other conventional coatings.

Polymer or Copolymer

The activatable material will typically include one or more additional polymers or copolymers, which can include a variety of different polymers, such as thermoplastics, elastomers, plastomers combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprises a small portion or a more substantial portion of the expandable material (e.g., up to 85% by weight or greater). Preferably, the one or more additional polymers comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins in the activatable material. When included, the one or more thermoplastic polyethers preferably comprise between about 1% and about 90% by weight of the activatable material, more preferably between about 3% and about 60% by weight of the activatable material and even more preferably between about 4% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

Although not required, it is preferable for the polymeric admixture to include one or more ethylene polymers or copolymers such as ethylene acrylates, ethylene acetates or the like. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Impact Modifier

Generally, it is preferable for the activatable to include at least one impact modifier. As used herein, like with any other ingredients of the present invention, the term "impact modifier" can include one impact modifier or plural impact modifiers. Various impact modifiers may be employed in the practice of the present invention and often include one or more elastomers. It is generally preferable for the impact modifier to be at least 4%, more typically at least 7%, even more typically at least 10%, still more typically at least 13% and even still more typically at least 16% by weight of the activatable material and also preferable for the impact modifier to be less than 90%, more typically less than 40% an even more typically less than 30% by weight of the activatable material, although higher or lower amounts may be used in particular embodiments.

In one embodiment of the present invention, the impact modifier includes at least one shell/core impact modifier and preferably the impact modifier includes a substantial portion of core/shell impact modifier. In one preferred embodiment, the impact modifier is compromised of at least 60%, more typically at least 80% and even more typically at least 97% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell impact modifiers are formed by emulsion polymerization followed by coagulation or spray drying. It is also preferred for the impact modifier to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful impact modifiers include, but are not limited to those sold under the tradename, PARALOID, commercially available from Rohm & Haas Co. One particularly preferred grade of PARALOID impact modifier is polymethyl methacrylate shell and MBS core modifier sold under the designation EXL-2691A.

Blowing Agent

One or more blowing agents may be added to the activatable material for producing inert gasses that form, as desired, an open and/or closed cellular structure within the activatable material. In this manner, it may be possible to lower the density of articles fabricated from the material. In addition, the material expansion can help to improve sealing capability, acoustic damping or both.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4$_t$-oxy-bis-(benzenesulphonylhydrazide), trihydrazinotriazine and N,N$_t$-dimethyl-N,N$_t$-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages.

In one embodiment, the present invention contemplates the omission of a blowing agent. Preferably, however, the material, the blowing agent or both of the present invention are thermally activated. Alternatively, other agents may be employed for realizing activation by other means, such as moisture, radiation, or otherwise.

Curing Agent

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

Preferably, the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

Filler

The activatable material may also include one or more fillers, including but not limited to particulated materials (e.g., powder), beads, microspheres, or the like. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% or less to 90% or greater by weight of the activatable material, but more typical from about 30 to 55% by weight of the activatable material. According to some embodiments, the activatable material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the activatable material assuming they are suitable for the activatable material and suitable for a chosen application of the activatable material.

One preferred polymeric additive is an oxide such as polyethylene oxide, which acts as a relatively high molecular weight coagulant that can assist in trapping gas and reducing sag. Such a coagulant will typically have a molecular weight of at least about 800,000, more typically at least about 2,000,000 and still more typically at least about 4,000,000 (e.g., about 5,000,000). One example of such an additive is sold under the tradename POLYOX WSR and is commercially available from Dow Chemical Company. When used, the oxide is typically at least about 0.1% by weight of the activatable material but is also typically less than about 3% by weight of the activatable material although amounts may be higher or lower unless otherwise stated.

Other additives, agents or performance modifiers may also be included in the activatable material as desired, including but not limited to a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like).

When determining appropriate components for the activatable material, it may be important to form the material such that it will only activate (e.g., flow, foam or otherwise change states) at appropriate times or temperatures. For instance, in some applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

Formation and Application of the Activatable Material

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to one embodiment, the activatable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the activatable material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the activatable material to activate (e.g., form gasses, flow, cure or otherwise activate) or both. Notably, when the activatable material contains a blowing agent, it is typically desirable to maintain the temperature of the activatable material below a temperature that will activate the blowing agent during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to applying heat, pressure or both to materials.

After formation of the activatable material, the material is typically applied to a surface or substrate and activated. Activation of the material may include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to flow without foaming or bubbling and may still substantially wet the substrate to form an intimate bond. Formation of the intimate bond will typically but not necessarily occur upon curing of the activatable material.

It shall be understood that, depending upon its the intended application, the activatable material may be applied and activated in different ways and at different times. Thus, exemplary uses of the activatable material are discussed below to illustrate preferred methodologies of application and activation of the activatable material. In particular, the activatable material may used for, amongst others, reinforcement, sealing and adhering, acoustic baffling or the like.

Reinforcement

The activatable material may be used to reinforce structural members of an article of manufacture. When used for reinforcement, the activatable material may be employed by itself, may be employed in conjunction with other materials (e.g., a backing), may be applied to a carrier member or the like.

According to one embodiment, the activatable material of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The activatable material of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

Examples of carrier members, structural reinforcement applications or the like, which may be employed in the present invention are disclosed in U.S. Pat. Nos. 6,474,723; 6,467,834; 6,419,305; 6,358,584; 6,311,452; 6,296,298; 6,263,635, all of which are hereby incorporated by reference. Other examples are disclosed in U.S. patent application Ser. Nos. 10/236,315; 10/098,952; 10/337,446; 09/939,152; 09/459,756; 60/409,625; 60/333,273; 60/317,201 all of which are also incorporated herein by reference for all purposes.

For purposes of illustration, FIG. 1 shows a reinforcement member 10 comprised of a carrier member 12 having masses 14 of activatable material disposed thereon. As shown the carrier member 12 is skeletal and includes a plurality of ribs 20. Moreover, the activatable material has been disposed upon the carrier member 12 in layers of substantially uniform thickness. It is contemplated however, that the carrier member 12 and the activatable material may be formed according to any suitable shape or configuration depending upon their intended application.

Figure 2:
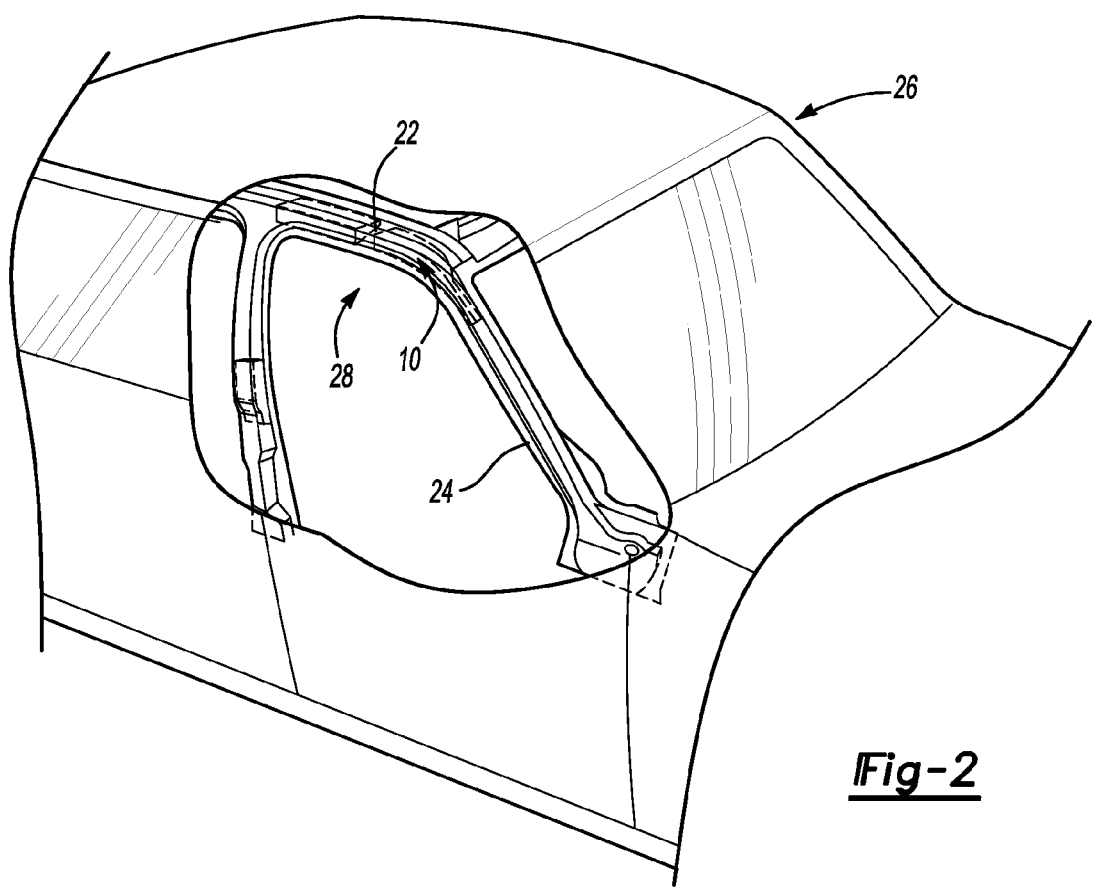
FIG. 2 is a perspective view of an automotive vehicle according to an aspect of the present invention.

The exemplary reinforcement member 10, as shown in FIG. 2, has been inserted into a cavity 22 that is defined by a pillar structure 24 of an automotive vehicle 26. After insertion into the cavity 22, the masses 14 of activatable material are preferably activated to adhere to walls of the pillar structure 24 that define the cavity 22. For example, the masses 14 may be exposed to elevated temperature in an e-coat or painting operation thereby causing the masses 14 of activatable material to become flowable and expand to contact the walls of the pillar structure 24. At the same time or thereafter, the masses 14 may cure to adhere and bond to the walls of the pillar structure 24 thereby forming a reinforced structural system 28 for the vehicle 26.

Figure 3:
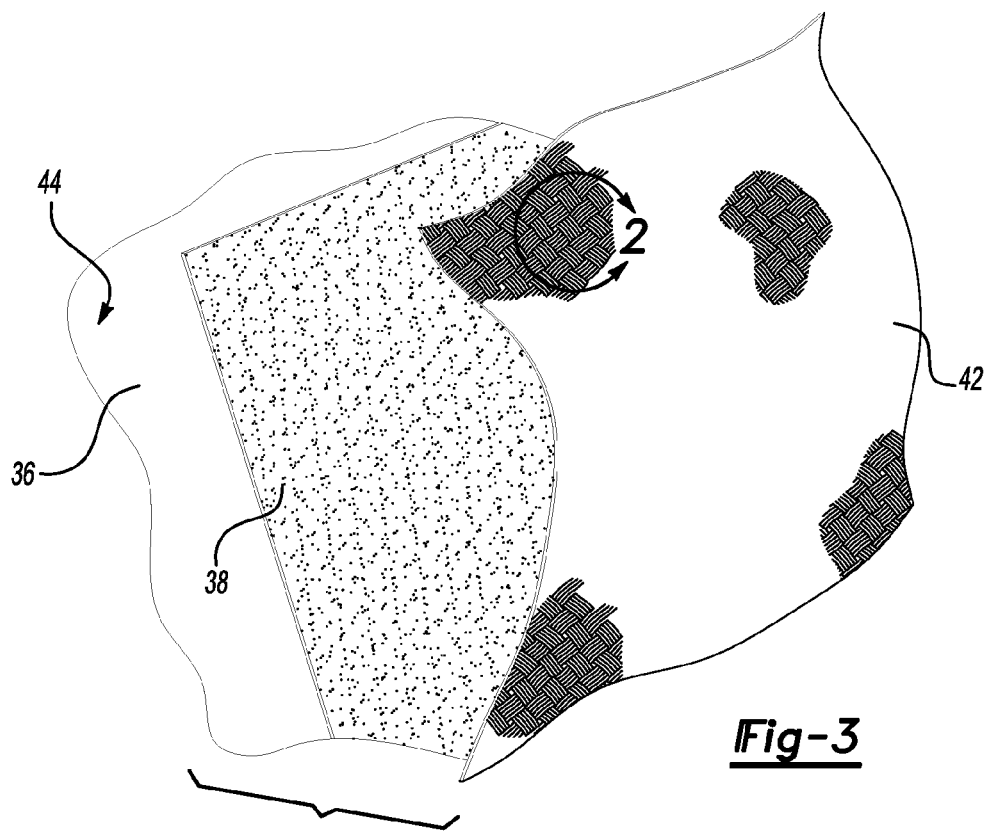
FIG. 3 is a perspective view of a panel being reinforced in accordance with an aspect of the present invention.
Figure 4:
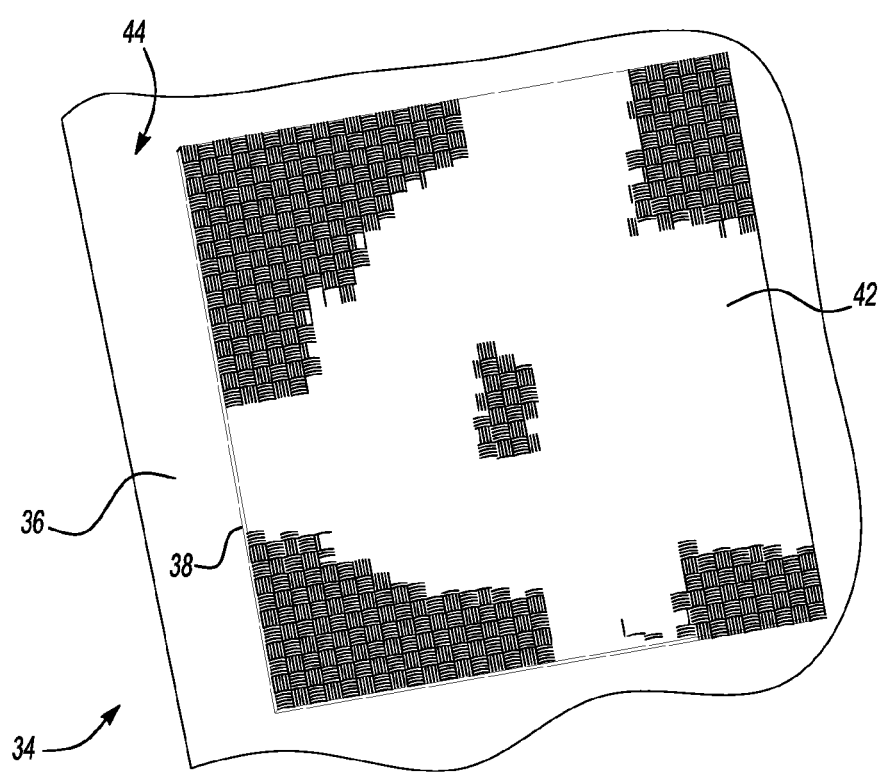
FIG. 4 is a perspective view of a reinforced panel formed in accordance with an aspect of the present invention.

Also for purposes of illustration, FIGS. 3 and 4 show the formation of a reinforced panel 34 comprised of a panel 36, a layer 38 of activatable material and a backing material 42. The panel 36 may be provided by any suitable component of the automotive vehicle. According preferred embodiment, the panel 36 is provided as an inner or outer body panel (e.g., a door panel, a roof panel, a side panel, a closure panel or the like) of the vehicle.

The backing material 42 may be chosen from a variety of materials. For example, and without limitation, the backing material may be formed of metal foils, metal sheets, metal screens or the like. As alternative examples, the backing material may be formed of polymeric (e.g., thermoplastic) films, sheets or mesh. In still other alternative embodiments, the backing material may be formed of cellulose fiber material such as impregnated or non-impregnated paper, wood or the like.

The reinforced panel 34 is formed by applying the layer 38 of activatable material to a surface 44 of the automotive vehicle panel 36 and applying the backing material 42 to the layer 38 of activatable material. It should be understood that the layer 38 of activatable material may be applied to the automotive vehicle panel 36 before, after or simultaneous with application of the backing material material 42 to the layer 38.

After application, the layer 38 of activatable material is preferably activated to adhere and bond to the panel 36 and the backing material 42. For example, the layer 42 may be exposed to elevated temperature in an e-coat or painting operation thereby causing the layer 42 of activatable material to become flowable and expand to contact and wet the panel 36 and the backing material 42. At the same time or thereafter, the layer 42 may cure to adhere to the panel 36 and the backing material 42 thereby forming the reinforced panel 34.

One exemplary activatable material that is particularly suitable for use in reinforcement application is in table I below.

TABLE I

| Ingredient | Percent of Formula Wt. % |
| --- | --- |
| Epoxy/Elastomer Adduct | 13.66 |
| Epoxidized Ethylene Copolymer | 1.93 |
| Ethylene Methacrylate | 1.93 |
| Polyethylene Oxide | 0.48 |
| Filler | 43.15 |
| Epoxy Resin (solid-liquid mixture) | 11.74 |
| Multifunctional Phenolic Novalac Epoxy Resin | 4.07 |
| Curing Agent and/or Accelerator | 3.05 |
| Impact Modifier | 19.18 |
| Blowing Agent | 0.71 |
| Pigment | 0.10 |

While table I provides one specific formulation, it is contemplated that weight percentages of the various components may be varied by ±20%, by ±50% or more. Moreover, components may be removed or added and components may be replaced. For example, it may be desirable to omit one or more of the modified urea, nanoclay, cyanoguanidine, pigment or other ingredients. Further, other blowing agent may be substituted as may other methacrylates, epoxies, fillers, fibers or otherwise.

Structural Adhesive

According to another embodiment, it is contemplated that an activatable material according to the present invention may be employed as a structural adhesive material. In such an embodiment, the material is typically activated and cured (e.g., at temperatures common to e-coat or automotive painting operatings) to adhere to a first member and a second member. Contact with attachment surface of the first member and the second member may occur prior to or during activation and curing of the material. Examples of structural adhesive applications are disclosed in U.S. patent application Ser. Nos. 10/234,902; 10/386,287; 60/451,811, all of which are incorporated herein by reference for all purposes.

Non-Tacky Surface

In another embodiment of the present invention, an outer surface of the material of the present invention is treated for allowing it to be handled without undesirable material transfer or tackiness. Thus, it is possible that a synthetic material may be provided with a layer (from less than about 10 microns to about 2 cm (e.g., on the order of less than about 1 mm)) that is generally free of tack for facilitating handling. This layer may take the form of a plastic transfer film, a water based coating, a powder coating or otherwise. The present invention thus also contemplates a tacky structural adhesive material having a layer providing handling surface that is generally free of tack to the touch. It is also contemplated that the structural adhesive material, the layer or both may be formed of the activatable material of the present invention.

Advantageously, the activatable material of the present invention has shown valuable properties in its applications. Moreover, activatable materials according to the present invention can exhibit relatively high strength moduli while also exhibiting a high degree of ductility. The activatable material, particularly for certain combinations and amounts of ingredients (e.g., combination of certain amounts of adduct, amounts of impact modifier or both) as disclosed herein, can exhibit various desirable properties. These properties are clearly displayed using a conventional double lap shear test method. Such method is described in ASTM Method D3528-96, Type A configuration, using the following test parameters: test adherends are 0.060 inch thick, 1 inch×4 inch EG-60 metal pre-cleaned with acetone; each adhesive bond line is 3 mm; test overlap dimension is 1 inch×0.5 inch; test rate is 0.5 inch/minute. Such test method can be used to derive desirable properties such as the following: the ratio of the strain-to-break divided by the strain-at-peak stress, which is referred to herein as the ductility ratio; the energy-to-break, which is calculated as the area under the stress-strain curve using the strain at break as the terminal value for the area calculation.

As one example, certain activatable materials formed in accordance with the present invention have exhibited a post-activation ductility ratio that is greater than about 2.0, more typically greater than about 2.5 and even possibly greater than about 2.8. As another example, certain activatable materials formed in accordance with the present invention have exhibited a post-activation energy-to-break value of greater than about 550 Nmm, more typically greater than about 700 Nmm and possibly greater than about 750 Nmm when determined in accordance with the aforementioned test method.

As yet another example, certain activatable materials formed in accordance with the present invention have exhibited post-activation tensile modulus greater than about 15 MPa, more typically greater than about 200 MPa and even possibly greater than about 350 MPa when determined in accordance with ASTM D638 Type IV test method. Moreover, the activatable material, particulary when provided as a solid, is typically less susceptible to breakage (e.g., chipping or the like).

Activatable materials formed in accordance with the present invention have also exhibited desirable post activation compressive properties. In particular, activatable materials of the present invention were foamed to form samples that were then tested according to a method that is based upon ASTM C39. While the method is described herein, it should be understood that any unspecified parameters will be in accordance with ASTM C39. The samples were formed by foaming the activatable material in cylinders or cylindrical cups followed by removing excess foam that extends out of the cylinders or cups (e.g., by cutting away foam that extends out of the cylinders or cups). The samples are typically foamed to a volume that is less than 1000%, more typically less than 750% and even more typically less than 500% relative to the original volume of the activatable material prior to foaming. This is done to form cylindrical samples that are 60 mm in height and 30 mm in diameter. The cylindrical samples are then tested according to ASTM C39.

Figure 5:
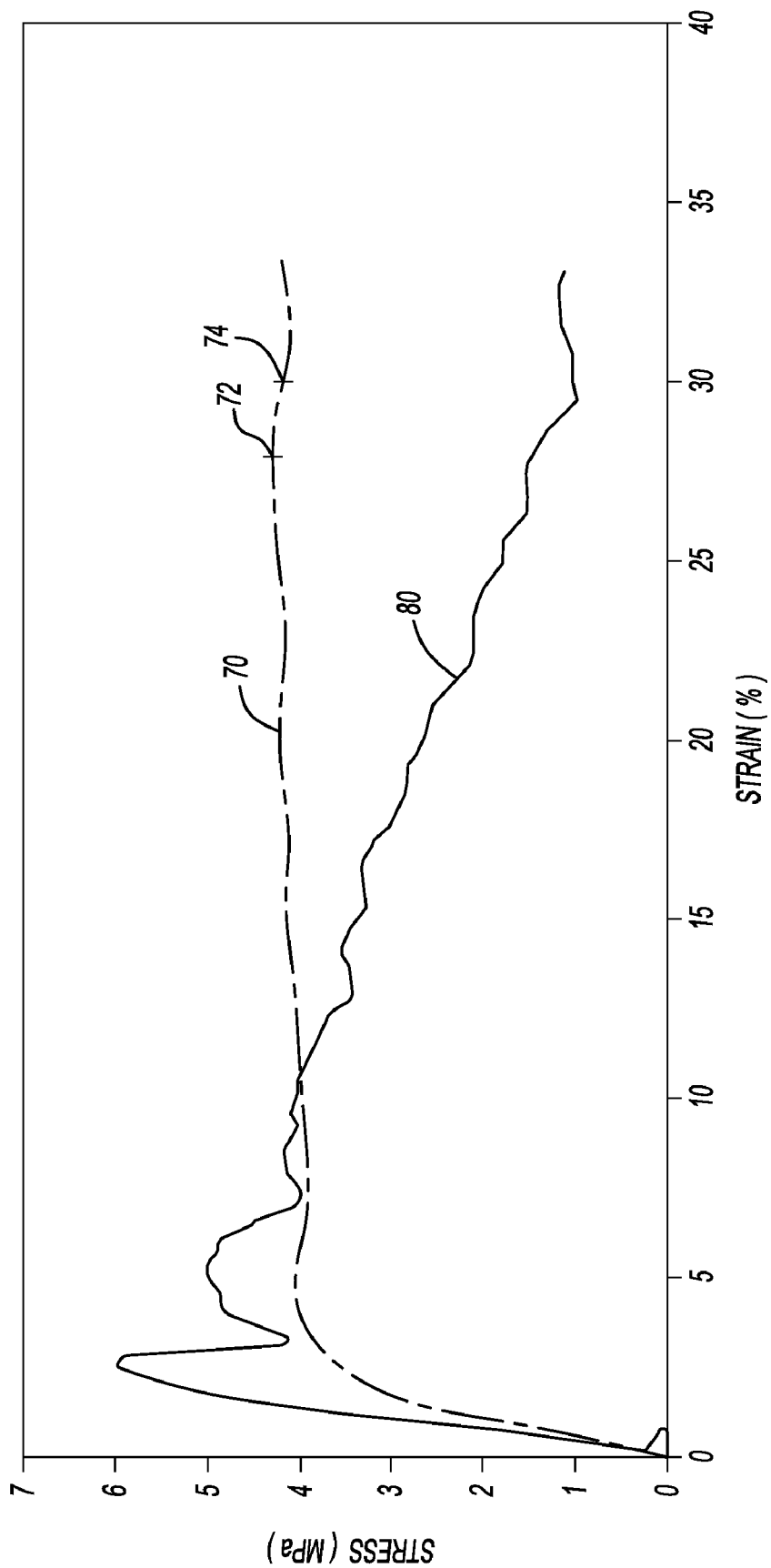
FIG. 5 is a graph of compression testing of an exemplary activatable material of the present invention after activation thereof.

With reference to FIG. 5, the samples are compressed at a rate of 0.5 inches/minute, and the stress/strain curve 70 recorded. The compression continues until a strain of 30% is reached; this corresponds to crushing the cylinder from the original height of 60 mm to a final height of 42 mm. Testing is done under ambient conditions. A value 72 is attained for compressive strength, which is the maximum value of stress sustained by the test specimen. In the assessment of ductility, the stress level 74 sustained by the specimen at the final strain level of 30% is also attained. Then a ratio is established as the stress level 74 at 30% strain divided by the maximum stress 70 sustained by the specimen. This ratio is referred to herein as the ratio of retention of strength at 30% strain.

The ratio of retention of strength at 30% strain for activatable materials of the present invention that have been foamed to 200%, 300% or 400% is typically at least 0.7, although possibly less, more typically at least 0.77, still more typically at least 0.8 and even possibly at least 0.84 or 0.88. For comparative purposes, FIG. 1 shows a curve 80 typical of prior activatable materials which have been tested to have a ratio of retention of strength at 30% strain of less than 0.6. It should be noted that this property for the activatable materials of the present invention is typically relatively independent of the amount of foaming as long as the foaming is below the aforementioned parameter or possibly no foaming. Having such retention of strength allows these activated activatable material to absorb greater energy.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of sealing, baffling or reinforcing a portion of an automotive vehicle, the method comprising:
    forming a tack-free activatable material, the activatable material formed by:
    a. feeding one or more components into a rotating container, including:
        i) an epoxy resin;
        ii) at least about 13% to about 30% by weight epoxy/elastomer adduct, the adduct including about 1:3 to 3:1 parts of epoxy to elastomer and being solid at a temperature of 23° C.;
        iii) at least about 10% to about 30% by weight core/shell polymer impact modifier that comprises a core portion including a butadiene styrene copolymer and a shell portion polymerized from methyl methacrylate, wherein the shell portion is grafted onto and encapsulates the core portion and the core portion has a glass transition temperature of at least about 10° C. below a glass transition temperature of the shell portion; and
    b. heating the components to a temperature so that the components are softened or liquidized to induce the components into a mixable state;
    c. intermixing the mixed components with one or more additional solid components including one or more curing agents and one or more liquid components including one or more liquid epoxy resins;
    locating the activatable material upon or adjacent a surface of a member of the automotive vehicle;
    activating the activatable material to bond the activatable material to the surface of the member of the vehicle, wherein the glass transition temperature of the core portion is less than about 23° C. and the glass transition temperature of the shell portion is at least about 23° C.

2. A method as in claim 1 wherein the step of locating the material includes placement of the first and/or second activatable material upon a carrier member and location of the carrier member adjacent the member of the vehicle.

3. A method as in claim 2 wherein the carrier member includes a plurality of longitudinal ribs intersecting a plurality of transverse ribs.

4. A method as in claim 1 wherein the activatable material includes a blowing agent.

5. A method as in claim 1 wherein the impact modifier is a core-shell graft co-polymer.

6. A method of adhering, the method comprising:
    forming an activatable material, the activatable material including:
    i) an epoxy resin;
    ii) at least about 13% to about 30% by weight core/shell polymer impact modifier that includes a butadiene styrene copolymer core and a methyl methacrylate shell, wherein the shell is grafted onto and encapsulates the core and the core has a glass transition temperature of at least about 10° C. below a glass transition temperature of the shell;
    iii) at least about 10% to about 30% by weight epoxy/elastomer adduct:
        a. the adduct including an acrylonitrile butadiene-based rubber portion;
        b. the adduct including about 1:3 to 3:1 parts of epoxy to elastomer; and
        c. the adduct being solid at a temperature of 23° C.;

wherein the epoxy resin, the impact modifier, and the epoxy/elastomer adduct are combined and heated so that they are softened or liquidized to induce a mixable state and then intermixed with additional solid components and additional liquid components;

activating the activatable material to form an activated material bonded to a surface of a member of the vehicle;

wherein the core/shell polymer impact modifier improves the ductility of the activated material so that it exhibits an energy to break of at least about 700 Nmm and a post-activation ductility ratio that is greater than about greater than about 2.5.

7. A method as in claim 6 wherein the activated material is a foamed material.

\* \* \* \* \*

UNITED STATES PATENT AND TRADEMARK OFFICE
CERTIFICATE OF CORRECTION

PATENT NO. : 7,892,396 B2
APPLICATION NO. : 11/757499
DATED : February 22, 2011
INVENTOR(S) : David Sheasley It is certified that error appears in the above-identified patent and that said Letters Patent is hereby corrected as shown below:

Page 2, U.S. Documents, Column 1, "JP9305103A" should read --WO9305103A--.

Signed and Sealed this
Fifth Day of April, 2011

David J. Kappos
*Director of the United States Patent and Trademark Office*